United States Patent Office 3,485,638
Patented Dec. 23, 1969

3,485,638
PROCESS FOR RETARDING MOLD GROWTH IN BREAD
Frederic R. Benson, Wilmington, Del., assignor to Atlas Chemical Industries, Inc., Wilmington, Del., a corporation of Delaware
No Drawing. Filed June 21, 1966, Ser. No. 559,333
Int. Cl. A21d 2/08
U.S. Cl. 99—91          5 Claims

ABSTRACT OF THE DISCLOSURE

The growth of mold in materials susceptible thereto is inhibited by contacting such materials with ethylidene dipropionate or propylidene dipropionate.

---

This invention relates to a process for inhibiting mold growth in materials susceptible thereto.

Compounds inhibiting mold growth are required in the following areas of application: superficial mycotic infections such as that due to *Trichophyton interdigitale* (athlete's foot) or *Trichophyton tonsurans* (ringworm); preservatives for pharmaceutical and cosmetic preparations; industrial antifungal uses such as preservatives for textile, leather, paint, pulp, paper and plastics; anti-mold compounds for foods, in particular to combat molds found on bread and other bakery products such as members of Rhizopus, Aspergillus and Penicillium genera.

Mold formation is caused by a species of microorganism which feeds upon a wide variety of different materials occurring in a natural or manufactured condition. The microorganisms grow and propagate rapidly under favorable conditions of humidity and temperature and, under unfavorable conditions such as insufficient moisture, they form highly resistant spores which readily become dispersed and scattered and immediately start mold growth when humidity and other conditions are favorable.

Bread, for example, being moist and porous makes an excellent medium for the growth of mold. Almost all of the common molds, *Aspergillus niger, Penicillium glaucus, Penicillus expansum, Rhizopus nigricans, Trichothecium roseum*, etc., under the favorable conditions existing in undried bread, grow rapidly on the surface of the loaf and between the slices if the bread is sliced. The wrapping of the bread and slicing it before wrapping have made the problem of molds more serious since the moisture-proof wrapper retains and holds the moisture of the loaf. As these molds render the bread unfit and possibly dangerous for the consumer, the molding of the bread even after being wrapped and sold is a constant source of expense and annoyance. Similar difficulties also occur in other goods such as cheese, cereal products, butter, icings and other products of animal or vegetable origin.

Due to the wide diffusion of mold spores, it is substantially impossible to prevent their access to products stored or processed under commercial conditons. As a result, mold formation rapidly sets in after such products have been exposed to the air either during processing or storage and when subjected to moisture and temperature conditions suitable for the growth of the mold.

Various compounds inhibit mold growth in materials susceptible thereto. However, many of these compounds are not entirely satisfactory for various reasons, such as high toxicity, poor inhibition of mold growth in certain materials, adverse effect on the treated materials, etc. For example, phenyl mercuric acetate is a highly effective mold inhibitor but due to its high toxicity cannot be used in foods, ethylidene diacetate, propyl propionate and butylidene dipropionate have poor inhibitory action, and while methylene dipropionate is highly effective in bread, it has an adverse effect on the flavor, odor and volume of the bread. In the particular case of inhibition of bread mold, the compounds of choice have been sodium and calcium propionates. Sodium and calcium propionates, while effective in controlling mold infection in bread, have several disadvantages, such as being solids and not miscible with shortenings and other nonaqueous components used in making bread, are powdery and difficult to handle and measure, and at levels above 0.17% (based on flour weight) have an adverse effect on the taste, smell and volume of the bread.

It is an object of this invention to obviate the disadvantages of the prior art and to provide a new and improved process for inhibiting the growth of mold in materials susceptible thereto.

It is a further object of this invention to provide a process for preventing mold in food.

It is also an object of this invention to provide a process for preventing mold in bread without adverse effect upon the bread.

It is another object of this invention to provide liquid compounds for inhibiting the growth of mold in any material susceptible thereto without adverse effect upon the treated material.

Other objects and advantages of this invention will be apparent from the following description and appended claims.

According to the present invention, the growth of mold in materials susceptible thereto is inhibited by contacting such materials, either by coating therewith or by incorporating therein, with ethylidene dipropionate or propylidene dipropionate.

Ethylidene dipropionate and propylidene dipropionate can be prepared by heating the appropriate aldehyde with propionic anhydride in the presence of an acid catalyst according to the reaction.

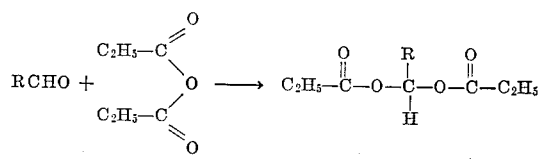

For example, ethylidene dipropionate may be prepared according to the following procedure, Propionic anhydride, 4.4 moles, and 1 gram of sulfuric acid are placed into a three-necked flask equipped with a mechanical stirrer, thermometer, reflux condenser, and dropping funnel. The mixture of anhydried and sulfuric acid is heated to 70° C. and then four moles of acetaldehyde are added dropwise through the dropping funnel. The addition requires 2–3 hours and then the reaction mixture is heated for an additional 2–3 hours at 80–90° C. The product is diluted with 300 ml. of chloroform and washed several times with a solution of 0.5% sodium hydroxide until the acid number is less than one. The chloroform is removed under vacuum and the final product is either treated with Darco activated carbon or distilled under vacuum. Propylidene dipropionate may be prepared according to the foregoing procedure by using propionaldehyde in place of the acetaldehyde.

Ethylidene and propylidene dipropionates may be applied in any way appropriate to the material treated. The said dipropionates may be incorporated directly into the material treated or by spraying the surface thereof with the liquid dipropionate or by dipping the material into the liquid dipropionate. For example, the mold inhibitors of this invention may be applied to the surface of cheese, cereals, fruits, vegetables, tobacco, paper, leather, textiles, wood, etc., by spraying or dipping or incorporated into foodstuff such as bread by adding to the ingredients before, during or after mixing.

The amount of ethylidene and propylidene dipropionate used depends to a large extent on the nature of the material treated. In the particular case of inhibition of mold in bread, for example, the use of from about 0.05% to about 0.2% based on weight of flour is suitable. The preferred amount is from about 0.12% to about 0.18% based on weight of flour. In the treatment of topical fungal infections, ethylidene and propylidene dipropionates may be applied full strength to the infected area or applied as a dilute solution. Dilute solutions are highly effective at concentrations as low as 0.05% by weight, based on the total weight of the solution.

EXAMPLE 1

Bread was prepared by the sponge and dough procedure.

The loaves were wrapped in waxed paper, sealed, stored overnight, after which they were cut with a sterilized knife and the center slice removed. The center slice was cut vertically in two and both halves were inoculated with mold spores as follows. Two transfer loops of mold spores from actively growing mold were suspended in 75 ml. of sterile distilled water in a 250 ml. of Erlenmeyer flask. Clumps of spores were broken by vigorous shaking with glass beads. This suspension was further diluted 1:100 with sterile distilled water to provide the working mold suspension. The bread was inoculated with a sterile loop dipped into the working mold suspension to get a standard loop full. This was transferred to a slice, placing the spot about one inch from the one end, with a similar spot on the other end. Inoculated samples were then inserted into cellophane bags which were heat sealed. They were inoculated at 30° C. and examined daily for mold growth. The time of appearance of mold was noted and the extent of growth indicated by 1 (slight), 2 (moderate), 3 (moderately heavy) and 4 (heavy). The results are shown in Table I.

TABLE I

| Item No. | Mold inhibitor | Percent of mold [1] inhibitor | Days of incubation | | | | | | |
|---|---|---|---|---|---|---|---|---|---|
| | | | 3 | 4 | 5 | 6 | 7 | 10 | 11 | 12 |
| 1a | Control | 0 | 1 | 2 | 3 | 4 | 4 | 4 | 4 | 4 |
| 1b | do | 0 | 1 | 2 | 4 | 4 | 4 | 4 | 4 | 4 |
| 2a | Propylidene dipropionate | 0.12 | | 1 | 1 | 2 | 3 | 4 | 4 | 4 |
| 2b | do | 0.12 | | 1 | 1 | 2 | 2 | 3 | 3 | 3 |
| 3a | do | 0.15 | | | 1 | 1 | 2 | 4 | 4 | 4 |
| 3b | do | 0.15 | | | 1 | 1 | 2 | 4 | 4 | 4 |
| 4a | do | 0.18 | | | | | | 1 | 1 | 1 |
| 4b | do | 0.18 | | | | | | | | 1 |
| 5a | Ethylidene dipropionate | 0.09 | | | 1 | 2 | 3 | 4 | 4 | 4 |
| 5b | do | 0.09 | | | 1 | 1 | 2 | 3 | 4 | 4 |
| 6a | do | 0.12 | | | | 1 | 1 | 2 | 2 | 3 |
| 6b | do | 0.12 | | | | 1 | 1 | 1 | 1 | 2 |
| 7a | do | 0.15 | | | | | | | 1 | 1 |
| 7b | do | 0.15 | | | | | | | | |
| 8a | Calcium propionate | 0.12 | | | 1 | 1 | 2 | 3 | 4 | 4 |
| 8b | do | 0.12 | | | 1 | 1 | 2 | 4 | 4 | 4 |
| 9a | do | 0.15 | | | | 1 | 1 | 2 | 2 | 2 |
| 9b | do | 0.15 | | | | | | 1 | 1 | 2 |
| 10a | do | 0.18 | | | | | 1 | 2 | 2 | 2 |
| 10b | do | 0.18 | | | | | | | | |

[1] Based on flour weight.

FORMULA

| Ingredient | Sponge | | Dough | |
|---|---|---|---|---|
| | Percent | Grams | Percent | Grams |
| Flour | 70 | 700 | 30 | 300 |
| Water | 41 | 410 | 27 | 270 |
| Yeast | 2.5 | 25 | | |
| Yeast food | 0.5 | 5 | | |
| Salt | | | 2 | 20 |
| Sugar | | | 6 | 60 |
| Non-fat dry milk | | | 4 | 40 |
| Lard | | | 3 | 30 |
| Mold inhibitor | | | Variable | Variable |

| PROCEDURE | | |
|---|---|---|
| Mixing time [1] | 1 min. at 1st speed, 1 min. at 2nd speed. | 1 min. at 1st speed, 4 min. at 2nd speed. |
| Temperature | 78–79° F | 80–82° F. |
| Fermentation time | 4 hours | 30 minutes. |
| Intermediate proof | | 10 minutes. |
| Scaling weight | | 18½ oz. |
| Baking temperature | | 450° F. |
| Baking time | | 20 minutes. |

[1] Hobart A-120 with McDuffee bowl and fork.

EXAMPLE 2

Littman medium was prepared, according to the procedure outlined in the Difco Manual, ninth edition, pages 240 and 241, and the indicated amount of fungistat added. Samples of the medium were cooled and inoculated with *Microsporum audouini* (ringworm of scalp) Strain No. 12332, *Trichophyton mentagrophytes* (athlete's foot) Strain No. 9533, and *Trichophyton tonsurans* (ringworm) Strain No. 10217 obtained from the Type Culture Collection, Washington, D.C. The Littman medium was blue and the growth or absence of fungal growth was readily apparent. The samples were inspected after 24 hours, 48 hours and 72 hours and extent of growth indicated by 0 (no growth), 1 (isolated colonies), 2 (moderate growth) and 3 (heavy growth). The results are shown in Table II.

TABLE II

| Fungistat | *Microsporum andouini* | | | *Trichophyton acuminaturis* | | | *Trichophyton interdigitale* | | |
|---|---|---|---|---|---|---|---|---|---|
| | 24 hr. | 48 hr. | 72 hr. | 24 hr. | 48 hr. | 72 hr. | 24 hr. | 48 hr. | 72 hr. |
| Propylidene dipropionate, 0.1% | 0 | 0 | 0 | 0 | 0 | 0 | 0 | 0 | 0 |
| Propylidene dipropionate, 0.5% | 0 | 0 | 0 | 0 | 0 | 0 | 0 | 0 | 0 |
| Propylidene dipropionate, 1.0% | 0 | 0 | 0 | 0 | 0 | 0 | 0 | 0 | 0 |
| Control | 1 | 2 | 3 | 1 | 3 | 3 | 0 | 3 | 3 |

EXAMPLE 3

Concrete enamel floor paint resistant to the growth of mold is prepared by the following formulation:

| | Parts by weight |
|---|---|
| Cyclicized rubber | 100 |
| Carbon black | 2.2 |
| Titanium dioxide | 89.1 |
| Amorphous silica | 89.1 |
| Raw tung oil | 5 |
| Mineral spirits | 254 |
| Ethylidene dipropionate | 5 |

EXAMPLE 4

Mold resistant latex paint is prepared by the following formulation:

| | Parts by weight |
|---|---|
| Water | 200 |
| Clay | 100 |
| Lecithin | 6 |
| $TiO_2$ | 250 |
| Methyl cellulose | 155 |
| Glycol | 40 |
| Latex Dow F–122A15 | 350 |
| Propylidene dipropionate | 20 |

EXAMPLE 5

For the treatment of textile fabrics, an effective composition comprises:

| | Parts by weight |
|---|---|
| Ethylidene dipropionate | 50 |
| Water | 50 |
| Polyoxyethylene (20) sorbitan monooleate | 1 |

EXAMPLE 6

Samples of grating cheese were sprayed with a 50% aqueous dispersion of propylidene dipropionate and the cheese stored at the indicated temperature. Mold counts were made at 3-month intervals. The initial mold count was 900. The results are shown in Table III.

TABLE III

| Propylidene dipropionate, percent by weight based on weight of cheese | Temperature, °F. | Mold count | | |
|---|---|---|---|---|
| | | 3 months | 6 months | 9 months |
| 0 | 72 | 28,000 | 45,000 | 92,000 |
| 0.5 | 72 | 1,600 | 1,800 | 1,500 |
| .25 | 72 | 4,200 | 3,900 | 4,900 |
| 0 | 45 | 18,000 | 23,000 | 27,000 |
| 0.5 | 45 | 1,100 | 1,300 | 1,200 |
| 0.25 | 45 | 1,100 | 1,200 | 1,600 |

EXAMPLE 7

Samples of cottage cheese were mixed with the indicated amount of propylidene dipropionate and stored at 45° F. The samples were inspected after 6 days, 15 days, and 30 days and the extent of mold growth indicated by 0 (no growth), 1 (slight growth) and 2 (moderate growth). The results are shown in Table IV.

TABLE IV

| Propylidene dipropionate, percent by weight based on weight of cheese | 0 days | 6 days | 15 days | 30 days |
|---|---|---|---|---|
| 0 | 0 | 0 | 1 | 2 |
| .01 | 0 | 0 | 0 | 1 |
| .02 | 0 | 0 | 0 | 0 |
| .03 | 0 | 0 | 0 | 0 |
| .05 | 0 | 0 | 0 | 0 |
| .07 | 0 | 0 | 0 | 0 |
| .10 | 0 | 0 | 0 | 0 |

What is claimed is:

1. A process for retarding the growth of mold in bread which comprises incorporating into bread dough from about 0.05% to about 0.2%, based on the weight of flour employed in the dough of a compound selected from the group consisting of ethylidene dipropionate and propylidene dipropionate, and subsequently baking said dough.

2. A process of claim 1 wherein the said compound is ethylidene dipropionate.

3. A process of claim 1 wherein the said compound is propylidene dipropionate.

4. A process of claim 2 wherein the amount of ethylidene dipropionate is from about 0.12% to about 0.18% based on the weight of flour.

5. A process of claim 3 wherein the amount of propylidene dipropionate is from about 0.12% to about 0.18% based on the weight of flour.

References Cited

UNITED STATES PATENTS 2,446,505   8/1948   Arenson _____ 424—311

ALBERT T. MEYERS, Primary Examiner

D. R. MAHANAND, Assistant Examiner

U.S. Cl. X.R.

99—153, 150, 154; 106—15; 117—135.5, 138.5, 147, 154; 252—8.6, 8.57; 162—161, 160; 424—311